(12) United States Patent
Mendo (10) Patent No.: US 11,396,971 B2
(45) Date of Patent: Jul. 26, 2022

(54) SUPPORT TRIPOD FOR PHOTOGRAPHIC EQUIPMENT

(71) Applicant: VITEC IMAGING SOLUTIONS S.P.A., Cassola (IT)

(72) Inventor: Andrea Mendo, Rossano Veneto (IT)

(73) Assignee: VITEC IMAGING SOLUTIONS S.P.A., Cassola (IT)

(*) Notice: Subject to any disclaimer, the term of this patent is extended or adjusted under 35 U.S.C. 154(b) by 0 days.

(21) Appl. No.: 17/260,478

(22) PCT Filed: Jul. 26, 2019

(86) PCT No.: PCT/IB2019/056406
§ 371 (c)(1),
(2) Date: Jan. 14, 2021

(87) PCT Pub. No.: WO2020/021508
PCT Pub. Date: Jan. 30, 2020

(65) Prior Publication Data
US 2021/0317942 A1    Oct. 14, 2021

(30) Foreign Application Priority Data
Jul. 27, 2018 (IT) .................. 102018000007568

(51) Int. Cl.
*F16M 11/16*     (2006.01)
*F16M 11/24*     (2006.01)
*G03B 17/56*     (2021.01)

(52) U.S. Cl.
CPC ........... *F16M 11/16* (2013.01); *F16M 11/245* (2013.01); *G03B 17/561* (2013.01); *F16M 2200/021* (2013.01)

(58) Field of Classification Search
None
See application file for complete search history.

(56) References Cited

U.S. PATENT DOCUMENTS

| 663,535 | A | * | 12/1900 | Essner | ................... | F16M 11/16 |
| | | | | | | 248/177.1 |
| 701,042 | A | * | 5/1902 | Holmes | ................... | A47B 91/02 |
| | | | | | | 248/188.5 |

(Continued)

FOREIGN PATENT DOCUMENTS

| CN | 201993568 | 9/2011 |
| WO | 2010017668 | 2/2010 |

OTHER PUBLICATIONS

International Search Report dated Sep. 23, 2019 received in PCT Application No. PCT/IB2019/056406.

*Primary Examiner* — Steven M Marsh
(74) *Attorney, Agent, or Firm* — Stradley Ronon Stevens & Young, LLP (57) ABSTRACT

A support tripod for video-photographic equipment. The tripod has a cross-piece with a mount for the equipment and a plurality of support legs pivotable with respect to the cross-piece to open/close the tripod. Each leg has a first leg portion articulated to a corresponding hinge on the cross-piece so that the leg can be pivoted between a closed configuration, in which the legs are arranged almost parallel with each other, and at least one operative configuration, in which the legs are apart with respect to the cross-piece, and a second leg portion parallel with and connected to the first leg portion. The second leg portion has a member which extends mainly along a longitudinal axis. The second leg portion can slide along the longitudinal axis, moving with respect to the first leg portion to release the leg from the cross-piece and make the leg pivotable with respect to the cross-piece.

18 Claims, 4 Drawing Sheets

(56) References Cited

U.S. PATENT DOCUMENTS

| | | | |
|---|---|---|---|
| 2007/0090237 A1* | 4/2007 | Hsu | F16M 11/32 |
| | | | 248/178.1 |
| 2010/0019109 A1 | 1/2010 | Liu | |
| 2010/0108832 A1* | 5/2010 | Zen | F16M 11/32 |
| | | | 248/177.1 |
| 2021/0190261 A1* | 6/2021 | Warner | F16M 11/04 |
| 2021/0278031 A1* | 9/2021 | Speggiorin | F16M 11/32 |

* cited by examiner

SUPPORT TRIPOD FOR PHOTOGRAPHIC EQUIPMENT

CROSS REFERENCE TO RELATED APPLICATIONS

This application is a U.S. National Phase filing of International Patent Application No. PCT/IB2019/056406 filed on Jul. 26, 2019, which claims the priority of Italian Patent Application No. 102018000007568 filed on Jul. 27, 2018. The disclosures of these applications are hereby incorporated by reference in their entirety.

TECHNICAL FIELD

The present invention relates to a support tripod which is particularly though non-exclusively intended for supporting video-photographic equipment.

TECHNOLOGICAL BACKGROUND

In the technical field of photography, it is widely known to use support stands for photographic equipment, among which tripods are found to be particularly widespread and appreciated both at an amateur and at a professional level.

Tripods generally comprise a plurality of legs which are all hinged to a cross-piece, to which there is fixed an engaging plate for an item of video/photographic equipment.

In order to vary the height of the video/photographic equipment with respect to the ground or the support plane of the tripod, the angulation of the legs can be varied with respect to the cross-piece.

WO2005/068895, which is filed in the name of the same Applicant, describes a tripod in which each support leg has a sleeve to which the support leg is hinged by a fork-like member. Two teeth project from the external surface of the sleeve itself by a mutually different extent and are provided on the external surface of the sleeve. A lever is provided on the base of the fork-like member. The lever is accessible to the user from outside the tripod when the tripod is in an open position and can be moved between three different operative positions, in which the lever abuts, respectively, the external surface of the sleeve, the first tooth and second tooth in order to position the tripod in a closed position and in two different operative positions in which the legs are moved apart at predefined angles with respect to the cross-piece. By "predefined" is meant defined beforehand, so that the predefined characteristic must be defined, i.e., chosen or at least known, in advance of some event.

A drawback of such a tripod is that the lever projects externally with respect to the spatial requirement of the cross-piece in order to be gripped by the user. Accordingly, it may be knocked accidentally and moved, causing an undesirable movement of the tripod, or damaging it or breaking it.

Furthermore, the lever may remain entangled during transport or use and be potentially damaged, and/or cause undesirable movements of the tripod.

This type of mechanism is complex and therefore the construction of the tripod is difficult and consequently the tripod has a substantial cost.

Furthermore, this type of mechanism has a considerable number of parts and is not suitable for being used on tripods having small dimensions, such as, for example, table-top tripods.

SUMMARY OF THE INVENTION

The problem addressed by the present invention is to provide a tripod, which can be closed up, for photographic equipment which is structurally and functionally configured to overcome the limitations set out above with reference to the cited art. In the context of this problem, an object of the invention is to provide a tripod, the positioning of which is simple and secure at the same time.

Another object is to provide a tripod which can be closed up and which can be adjusted and which is at the same time easy to use and which allows precise positioning of the tripod.

Another object is to provide a tripod which is readily and quickly movable from a closure position to an operating position.

This problem is solved and these objects are achieved by a tripod for video-photographic equipment which can be closed up and which is constructed according to the following disclosure. The tripod has a cross-piece and a plurality of support legs. The cross-piece has a plurality of hinge elements and a mount for the video-photographic equipment. The support legs can be pivoted with respect to the cross-piece in order to open and close the tripod. Each leg has (a) a longitudinal axis, (b) a first leg portion which is articulated to a corresponding hinge element so that the leg can be pivoted between a closed configuration, in which the legs are arranged almost parallel with each other, and at least one operative configuration, in which the legs are apart with respect to the cross-piece, and (c) a second leg portion which is parallel with and connected to the first leg portion. The second leg portion has a member which extends mainly along the longitudinal axis. The second leg portion can slide along the longitudinal axis, moving with respect to the first leg portion to release the leg from the cross-piece and make the leg pivotable with respect to the cross-piece.

It may be noted that, in the description and the claims which follow, the term "tripod" is intended to be understood to indicate a stand which is provided with a cross-piece, to which a plurality of legs are articulated, without any specific limitations on the number of legs themselves which may be three or also a number other than three.

It is to be understood that both the foregoing general description and the following detailed description are exemplary, but are not restrictive, of the disclosure.

BRIEF DESCRIPTION OF THE DRAWINGS

The features and advantages of the invention will be better appreciated from the detailed description of preferred embodiments which are illustrated by way of non-limiting examples with reference to the appended drawings, in which.

PREFERRED EMBODIMENTS OF THE INVENTION

In the Figures, there is generally designated 1 a tripod which is constructed according to the present invention.

The tripod 1 comprises a cross-piece 2 which is formed so as to define a plurality of additional hinging pieces, in the region of each of which a seat 5 is provided for a hinging pin 3.

The tripod 1 further comprises a plurality of legs 4, each of which is hinged by a respective hinging portion 4A to a corresponding hinging pin 3 in order to be pivoted about a hinge axis X with respect to the cross-piece 2 in both directions of the rotation arrow F1.

The hinging pin 3 comprises a rod 30, to which there is connected in a rotatable manner the hinging portion 4A of each leg 4 and two blocking heads 31 which are provided at opposite sides of the rod 30 and which have radial dimensions greater than the dimensions of the rod 30 in order to prevent the hinging portion 4A from slipping off the hinging pin 3.

The cross-piece 2 is formed so as to define a support base 8 for an item of video-photographic equipment (which is not shown in the Figures) and is provided with a mount 9 for attaching the video-photographic equipment to the cross-piece 2.

The mount 9 can be constructed in any one of the manners known in the field.

The legs 4 of the tripod 1 are structurally and functionally identical, as a result of which only one will be described below for conciseness.

Each leg 4 of the tripod 1 extends along a longitudinal axis Y between a support portion 4B on the ground or on a desired support surface and the opposite hinging portion 4A, in the region of which the leg 4 is hinged to the cross-piece 2.

In a version which is not shown, each leg 4 of the tripod 1 is telescope-like in order to be able to vary the extension of the leg 4.

Figure 4:
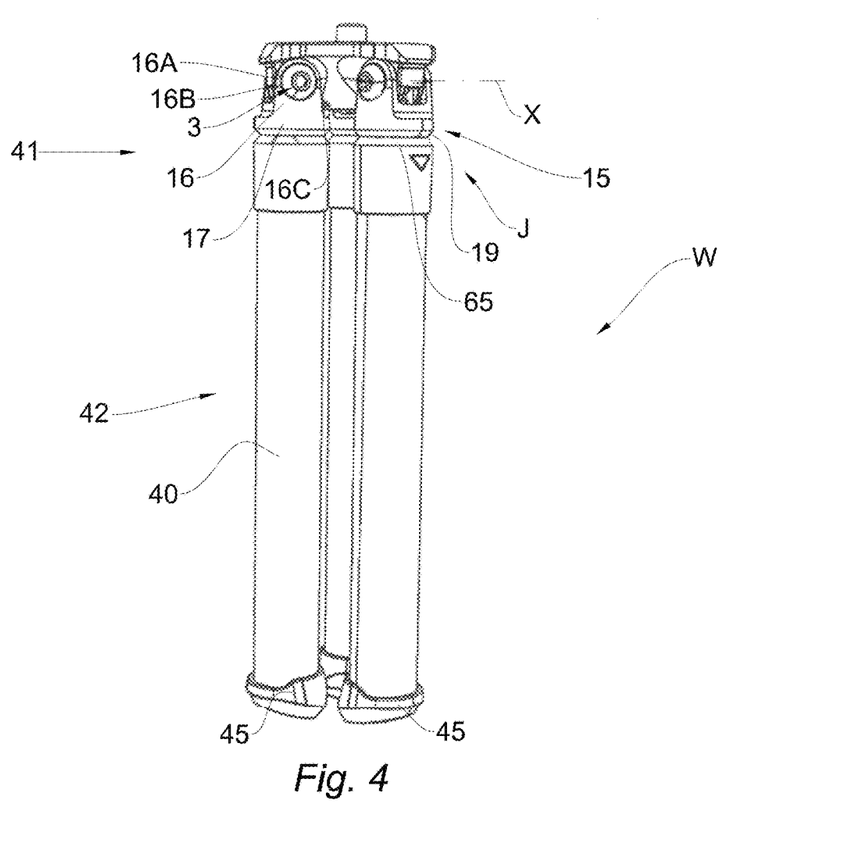
FIG. 4 is a front view of the tripod of FIG. 1 in a closed transport configuration.
Figure 5:
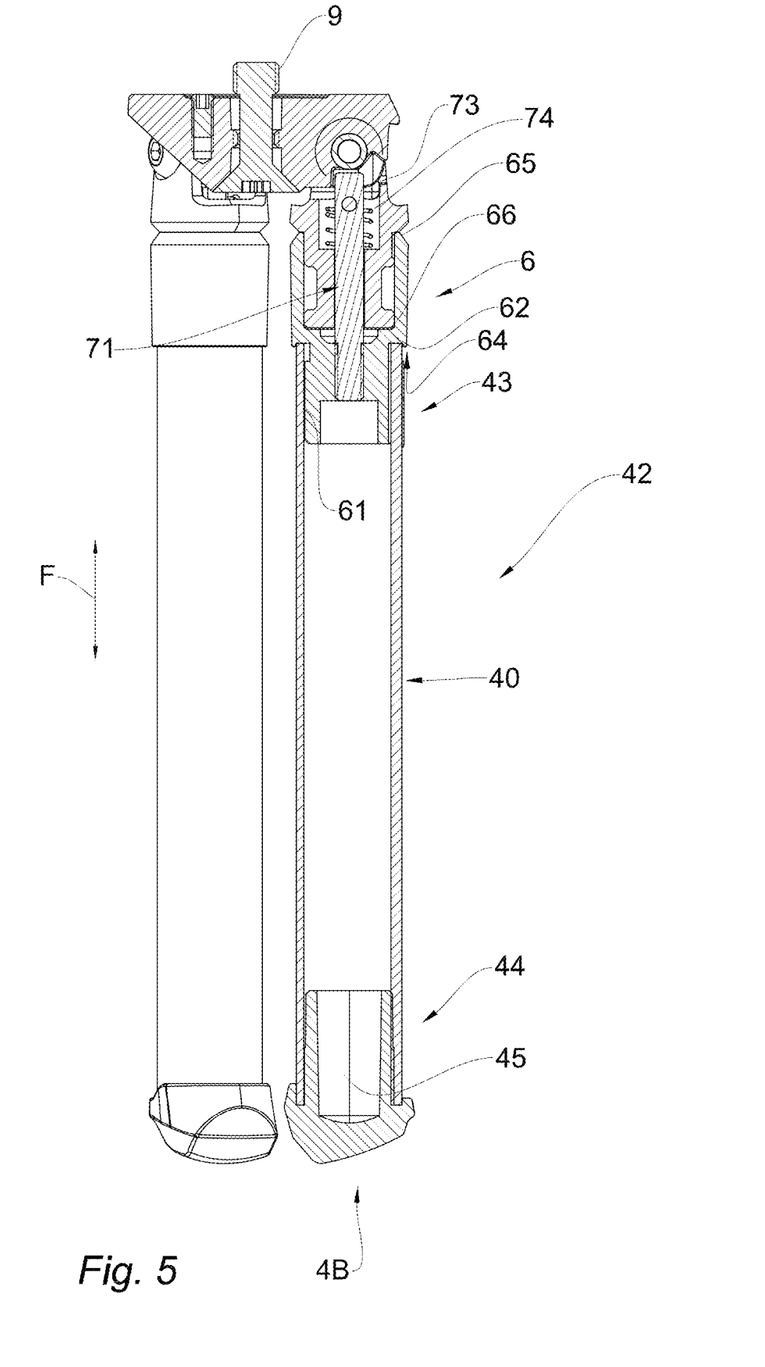
FIG. 5 is a sectioned view of the tripod of FIG. 4 with some parts being removed for clarity.

Each leg 4 can be pivoted with respect to the cross-piece 2 between a closed transport configuration W which is shown in FIGS. 4 and 5 and in which the legs 4 are arranged almost parallel with each other and at least one operative configuration in which the legs 4 are moved apart with respect to the cross-piece 2 and inclined with respect to the closed configuration W by a predetermined or predefined opening angle.

Figure 1:
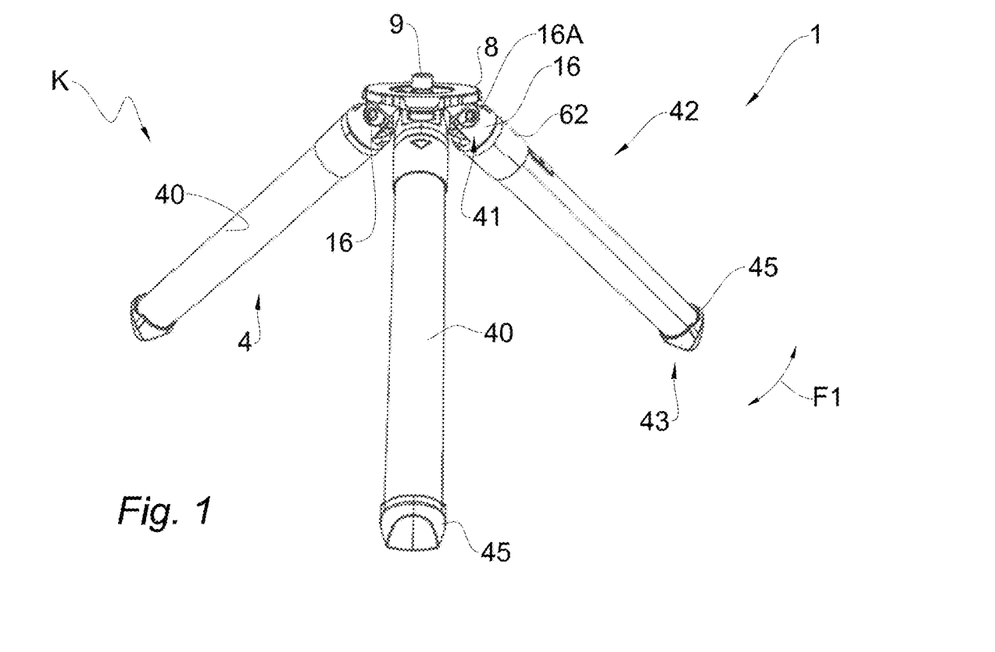
FIG. 1 is a front view of a tripod which is constructed according to the present invention in an operative configuration.
Figure 2:
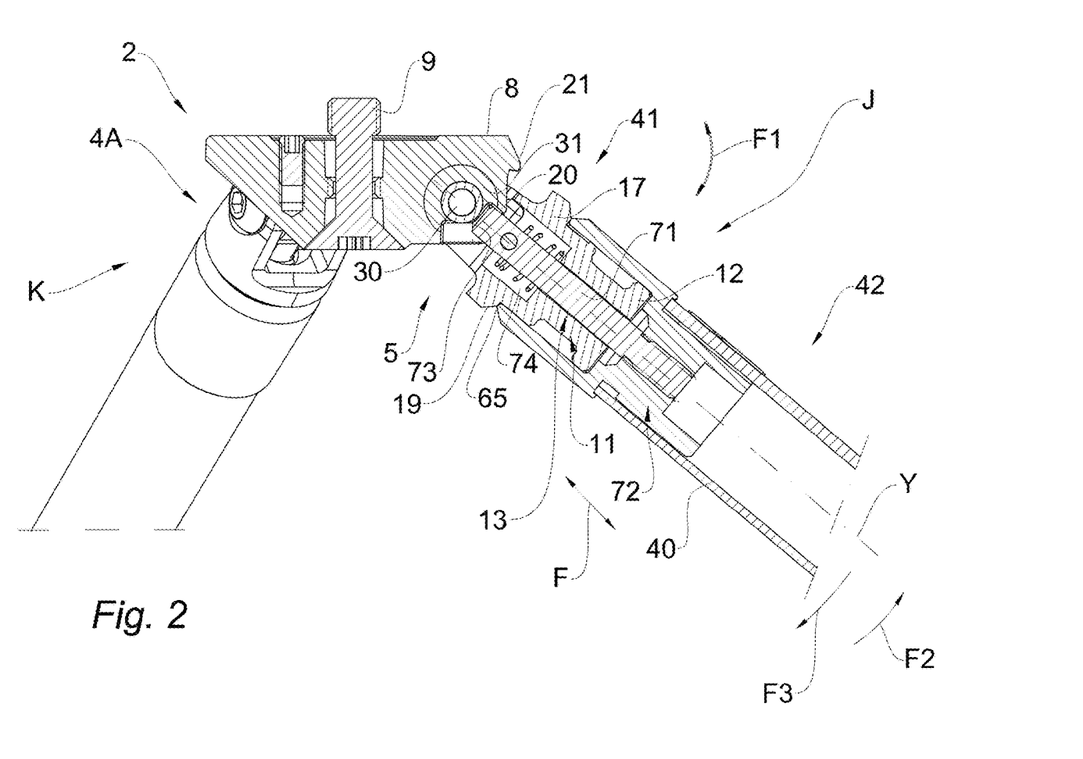
FIG. 2 is a sectioned view of a detail of the tripod of FIG. 1, with some parts being removed for clarity.
Figure 3:
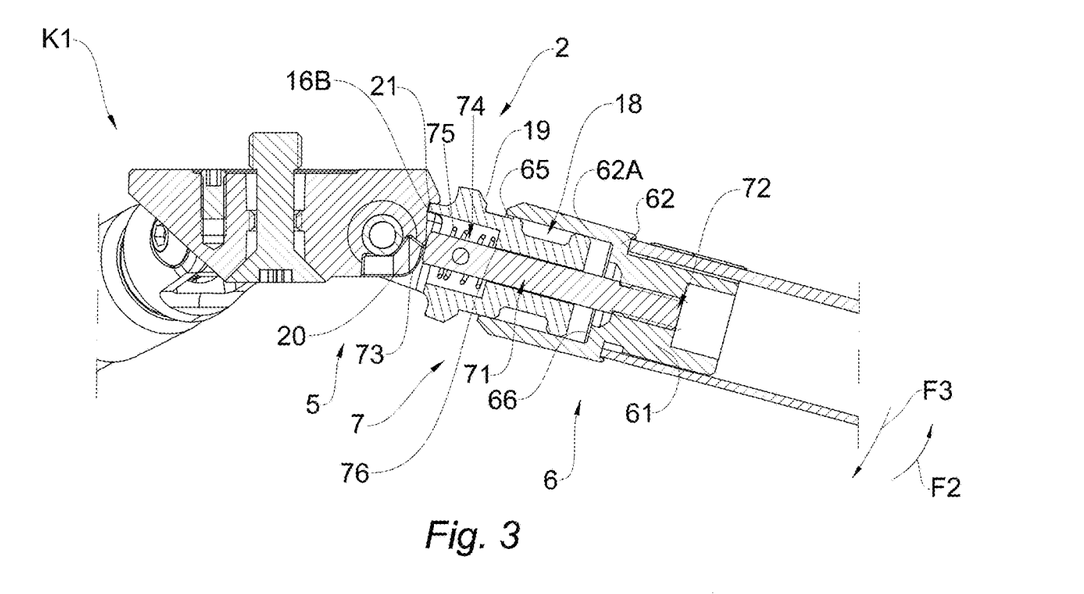
FIG. 3 is a sectioned view of a detail of the tripod of FIG. 1 in a different operative configuration.
Figure 3A:
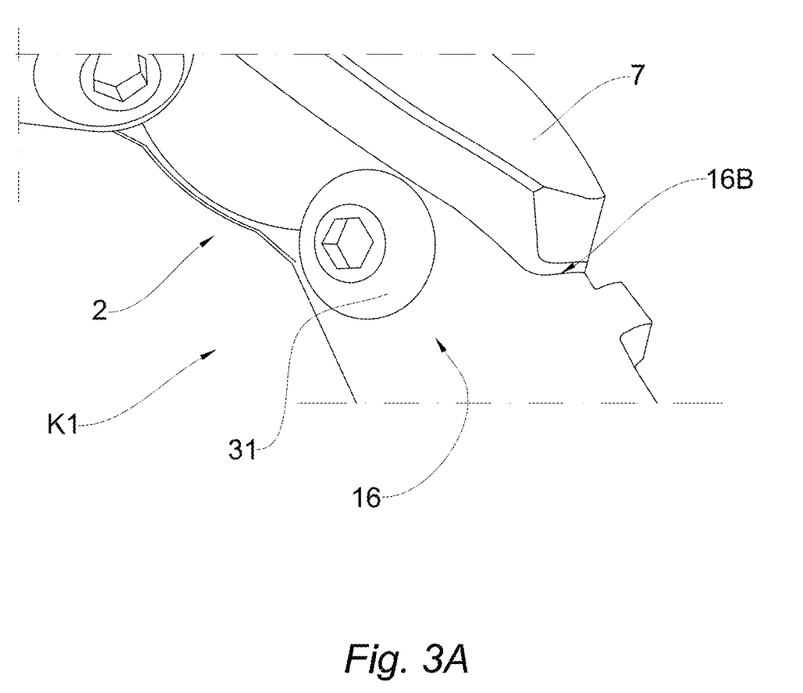
FIG. 3A is an enlarged view of a detail of the tripod of FIG. 3.

In the version shown, each leg 4 can be positioned in at least a first operative configuration K which is shown in FIGS. 1 and 2 and in a second operative configuration K1 which is shown in FIG. 3 and in which the legs 4 are in a moved-apart position with respect to the cross-piece 2 and are inclined with respect to the closed transport configuration W by a first and a second opening angle α, α1 (not shown) having mutually different values, respectively.

In each operative configuration K, K1, the leg 4 is blocked in terms of rotation with respect to the cross-piece 2 and rotation of the leg 4 is prevented with respect to the desired operative configuration K which is directed towards varying the first opening angle α of the leg 4 with respect to the cross-piece 2.

The cross-piece 2 is provided with a first positioning element 20 and a second positioning element 21 which are intended to interact with the leg 4 in order to block it in the first operative configuration K and in the second operative configuration K1, respectively, as better explained below.

In other versions which are not shown, the cross-piece 2 may be provided with a different number of positioning elements which define different operative configurations of the tripod 1.

The first positioning element 20 and the second positioning element 21 follow each other circumferentially about the rotation path of the hinging portion 4A about the cross-piece 2 and define different operative configurations for the legs 4.

The first positioning element 20 and the second positioning element 21 define respective different operative configurations K, K1 of the leg 4 with respect to the cross-piece 2, each one at a different opening angle of the leg 4.

The first positioning element 20 and the second positioning element 21 comprise an abutment face 20A, 21A which is intended to abut the leg 4 in the first operative configuration K and in the second operative configuration K1, respectively, and which is formed so as to prevent the rotation of the leg 4 away from the closed transport configuration W, that is to say, in the direction indicated by the arrow F2 in FIGS. 2 and 3, and as will be better explained below.

Each leg 4 comprises a first leg portion 41 which is articulated by the hinging portion 4A to the hinging pin 3 in such a manner that the leg 4 can be pivoted with respect to the cross-piece 2 and a second leg portion 42 which is parallel with the first leg portion 41 and which is connected to the first leg portion 41.

An end portion of the second leg portion 42 defines the support portion 4B for the leg 4.

In the version shown, the second leg portion 42 and the first leg portion 41 are coaxial, but in other versions which are not shown they may be parallel and non-coaxial.

The second leg portion 42 can slide along the longitudinal axis Y with respect to the first leg portion 41 in order to be moved with respect to the first leg portion 41 in order to secure and release the leg 4 to and from the cross-piece 2, as will be better explained below.

The second leg portion 42 can slide along the longitudinal axis Y with respect to the first leg portion 41 in order to be moved away from and towards the first leg portion 41 in order to secure and release the leg 4 to and from the cross-piece 2, as will be better explained below.

The second leg portion 42 acts as an actuation device for securing and releasing the leg 4 to and from the cross-piece 2.

Advantageously, a tubular member 40 of the second leg portion 42 acts as an actuation device for securing and releasing the leg 4 to and from the cross-piece 2.

The second leg portion 42 can slide with respect to the first leg portion 41 along the longitudinal axis Y in both directions of the arrow F in order to be moved between an extended release configuration which cannot be seen in the Figures and in which the second leg portion 42 is moved away from the first leg portion 41 and the leg 4 is released from the cross-piece 2 and is free to rotate with respect to the cross-piece 2 in both directions of the rotation arrow F1, and a retracted engaging configuration J, which is shown in FIG. 2 and in which the second leg portion 42 is in abutment against the first leg portion 41 and the leg 4 is secured to the cross-piece 2 and cannot be freely rotated with respect thereto.

The first leg portion 41 cannot be moved in translation with respect to the cross-piece 2, being hinged thereto by the hinging pin 3.

The second leg portion 42 comprises the tubular member 40 which is substantially cylindrical and internally hollow and which extends between a proximal end 43 which is nearer the first leg portion 41 and an opposite distal end 44.

The second leg portion 42 is provided at the distal end 44 with a cap 45 or similar covering element which defines the support portion 4B of the leg 4 on the ground.

The cap 45 is produced from rubber or another anti-slip material.

The second leg portion 42 is provided at the proximal end 43 with an adjustment device 6 in order to adjust the position of the second leg portion 42 with respect to the first leg portion 41, as better explained below.

The adjustment device 6 is intended to adjust the translational movement of the second leg portion 42 with respect to the first leg portion 41 along the longitudinal axis Y.

The adjustment device 6 is fixed to the second leg portion 42 and is fixedly joined thereto in terms of movement along the longitudinal axis Y.

The adjustment device 6 is therefore movable along the longitudinal axis Y in a manner fixedly joined to the second leg portion 42 with respect to the first leg portion 41.

The adjustment device 6 comprises a connection member 61 which is capable of being inserted in the tubular member 40 and a cylindrical collar 62 which is integral with the connection member 61 and which is intended to be positioned externally with respect to the tubular member 40. By "integral" is meant a single piece or a single unitary part that is complete by itself without additional pieces, i.e., the part is of one monolithic piece formed as a unit with another part.

The collar 62 is internally hollow so as to define a receiving cavity 18 and is delimited by an external wall 62A which is intended to be gripped by a user in order to move the second leg portion 42, as better explained below. The collar 62 is coaxial with the tubular member 40.

There is provided between the connection member 61 and the collar 62 a connection portion 66 which is interposed during use between the tubular member 40 of the second leg portion 42 and the first leg portion 41.

The collar 62 further comprises a free edge 65 which is directed towards the first leg portion 41 and which is capable of defining the abutment element for the first leg portion 41 on the second leg portion 42, as better explained below.

The second leg portion 42 further comprises a blocking device 7 for blocking the leg 4 with respect to the cross-piece 2.

The blocking device 7 is fixedly joined to the second leg portion 42.

The blocking device 7 is fixedly joined to the second leg portion 42 in terms of the translational movement thereof along the longitudinal axis Y.

The blocking device 7 is therefore movable along the longitudinal axis Y in a manner fixedly joined to the second leg portion 42 with respect to the first leg portion 41.

All three of the second leg portion 42, the adjustment device 6, and the blocking device 7 are fixedly joined in terms of translational movement along the longitudinal axis Y. Therefore, by moving in translation the second leg portion 42 along the longitudinal axis Y, the adjustment device 6 and the blocking device 7 also move at the same time.

Therefore, by moving the second leg portion 42 away from the first leg portion 41, the adjustment device 6 and the blocking device 7 are also moved in translation with respect to the first leg portion 41 along the longitudinal axis Y, as better explained below.

The blocking device 7 comprises a blocking pin 71 which extends along the longitudinal axis Y of the leg 4 between a first portion 72 thereof which is fixed to the connection member 61 of the adjustment device 6 and a free end 73 which is intended to interact with the cross-piece 2 in order to block the leg 4 with respect to the cross-piece 2 itself.

The free end 73 acts as a blocking element for the leg 4 on the cross-piece 2 in the first operative configuration K, as better explained below.

The blocking device 7 further comprises a spring 74 which is coaxial with the blocking pin 71 and which is intended to urge the blocking pin 7 into abutment against the cross-piece 2, as better explained below.

In other versions of the support tripod 1 of the invention, there may be provided pressing devices other than the spring 74 and intended to press the blocking pin 7 towards the cross-piece 2.

The spring 74 is preloaded to press the second leg portion 42 into abutment against the first leg portion 41, that is to say, in order to move the leg 4 into the retracted engaging configuration J.

The spring 74 is fixed at the opposing first and second ends 75, 76 thereof to the blocking pin 71 and to the first leg portion 41, respectively, as better explained below.

The first leg portion 41 can be pivoted with respect to the cross-piece 2 and is fixed in terms of translational movement with respect to the cross-piece 2 itself.

The first leg portion 41 comprises a sleeve 11 which extends along the longitudinal axis Y of the leg 4 and which is internally hollow so as to define a longitudinal cavity 13 in which the blocking pin 71 is slidingly received.

The sleeve 11 is inserted with the ability to slide in the receiving cavity 18 of the collar 62 so as to be able to slide inside the receiving cavity 18 along the longitudinal axis Y of the leg 4.

The first leg portion 41 further comprises a fork-like member 15, having a base 17, which is coaxial with the sleeve 11 and which extends from the sleeve 11 towards the cross-piece 2. The base 17 of the fork-like member 15 is fixed to the sleeve 11 and from which extend two arms 16 which face each other and which are hinged to the hinging pin 3 by respective hinging ends 16A.

The hinging ends 16A are provided with holes which cannot be seen in the Figures and which are intended to receive in a sliding manner the rod 30 of the hinging pin 3 in order to pivot the leg 4 with respect to the cross-piece 2.

The arms 16 of the fork-like member 15 are connected to each other by a connection wall 16B which is indicated in FIGS. 2 and 3 and which is configured to engage with the cross-piece 2 in the second operative configuration K1 in order to block the leg 4 in this configuration, as better explained below.

The fork-like member 15 is advantageously integral with the sleeve 11.

Advantageously, the first leg portion 41 is formed by a single member comprising the fork-like member 15 and the sleeve 11 among other parts.

The fork-like member 15 defines a second receiving cavity 14 which is coaxial with the longitudinal cavity 13 and which has a radial extent greater than the longitudinal cavity 13 and which is intended to receive the blocking pin 71 and the spring 74.

The second end 76 of the spring 74 is fixed to the base 17 of the fork-like member 15.

The base 17 of the fork-like member 15 has a radial extent greater than the receiving cavity 18 so as not to be able to be inserted therein and is intended to be arranged externally with respect to the collar 62.

An edge 19 of the base 17 of the fork-like member 15 is intended to act as an abutment element between the first leg portion 41 and the second leg portion 42 in the retracted engaging configuration J of the leg 4.

With the leg 4 in the retracted engaging configuration J, the free edge 65 of the collar 62 is in abutment with the base 17 of the fork-like member 15, while, in the extended configuration of the leg 4, the base 17 of the fork-like member 15 is spaced apart from the free edge 65 of the collar 62.

As mentioned, each leg 4 can be positioned in the closed transport configuration W which is considered below for convenience to be the position in which the legs 4 are arranged at an opening angle α'=0° and in two operative configurations K, K1 in which the legs 4 are in a moved-apart position with respect to the cross-piece 2 and are inclined with respect to the position in the closed transport configuration W by the first and a second opening angles α, α1 having mutually different values, respectively.

In each intermediate operative configuration K, K1, the leg 4 is blocked in terms of rotation with respect to the cross-piece 2: the rotation towards the closed transport configuration W, that is to say the rotation in the direction of the arrow F3, is prevented by the weight of the equipment which is engaged with the cross-piece 2, while the rotation away from the closure configuration W is prevented as explained below.

In the first operative configuration K, the leg 4 is blocked in this configuration by the blocking pin 71 which is in abutment against the abutment face 20A of the first positioning element 20.

In the second operative configuration K1, the leg 4 is blocked in this configuration by the fork-like member 15 because the connection wall 16B between the arms 16 is in abutment against the abutment face 21A of the second positioning element 21.

The blocking pin 71 and the connection wall 16B act as blocking elements for the legs 4 in the first and second operative configurations K, K1, respectively.

The blocking pin 71 and the connection wall 16B cooperate with the first and second positioning elements 20, 21 which are provided in the cross-piece 2 in order to block the legs 4 in the first and second operative configurations K, K1, respectively.

Therefore, the tripod 1 is prevented from moving from the preselected operative configuration into any operative configuration K, K1 as a result of the weight of the tripod itself and/or the equipment engaged therewith.

During use, when a user wishes to position the tripod 1 in the first operative configuration K from the closed transport configuration W, there is provision for gripping the legs 4 and rotating them.

During this rotation, the blocking pin 71 is pressed in a sliding manner by the spring 74 against the cross-piece 2.

The user can rotate the leg 4 until it reaches the first operative configuration K, that is to say, until the blocking pin 71, under the pressing action of the spring 74, moves into abutment against the first abutment face 20A of the first positioning element 20.

In order to move the tripod 1 from the first operative configuration K to the closed transport configuration W, the user rotates the legs 4 until this configuration is reached.

If, however, the user wishes to position the support tripod 1 in the second operative configuration K1, the user grips the second leg portion 42 and moves it along the longitudinal axis Y away from the first leg portion 41 and therefore away from the cross-piece 2.

Since, as mentioned, the second leg portion 42, the adjustment device 6, and the blocking device 7 are fixedly joined in terms of translational movement along the longitudinal axis Y, by moving the second leg portion 42 the adjustment device 6 and the blocking device 7 are also moved with respect to the first leg portion 41.

The user can grip the second leg portion 42 in any desired position, for example, at the collar 62 of the adjustment device 6 and/or of the tubular member 40 and can press in order to move the second leg portion 42 away from the first leg portion 41.

Since both the tubular member 40 and the collar 62 have a tubular formation, the user can grip them conveniently and simply, applying the pressure necessary to move the second leg portion 42 away from the first leg portion 41.

Furthermore, this design makes it easier for the user to actuate the tripod 1.

The tubular member 40 and/or the collar 62 act(s) as an actuator for the tripod 1 in order to move the second leg portion 42 away from the first leg portion 41.

The tubular member 40 and/or the collar 62 act(s) as a cylindrical actuator for the tripod 1 in order to move the second leg portion 42 away from the first leg portion 41.

During this movement, the collar 62 slides on the first leg portion 41 and the free edge 65 of the collar 62 is moved away from the base 17 of the fork-like member 15.

During this movement, the blocking pin 71 slides in the longitudinal cavity 13 of the sleeve 11 of the first leg portion 41 away from the cross-piece 2.

Furthermore, this movement compresses the spring 74 because this movement causes the opposite first and second ends 75, 76 of the spring 74 to move together.

In this manner, the blocking pin 71 is moved away from the cross-piece 2 and is released from the first positioning element 20.

After the blocking pin 71 has been released from the first positioning element 20, the user can rotate the leg 4 until it reaches the second operative configuration K1 because this movement is no longer impeded by the interaction between the blocking pin 71 and the first positioning element 20.

When the blocking pin 71 is disengaged from the first positioning element 20, the leg 4 is free to rotate with respect to the cross-piece 2 in both directions of the rotation arrow F1, that is to say, both towards the closed transport configuration W and towards the second operative configuration K1.

The user continues to rotate the leg 4 until the connection wall 16B of the arms 16 abuts against the second abutment face 21A of the second positioning element 21.

Any additional rotation of the leg 4 so as to open beyond the second operative configuration K1 is prevented by the engagement of the connection wall 16B and the second positioning element 21.

Once the desired operative configuration has been reached, the spring 74 urges the second leg portion 42 towards the first leg portion 41 so as to maintain in a stable manner the positioning of the tripod 1 in the desired operative configuration.

The spring 74 is preloaded in order to urge the blocking pin 71 towards the cross-piece 2 and therefore the adjustment device 6 and the blocking device 7 towards the first leg portion 41.

In order to rotate the leg 4 from the second operative configuration K1 towards the closed transport configuration W, it is simply necessary to rotate the leg 4 until it reaches the first operative configuration K or the closed transport configuration W.

Therefore, the closure of the tripod 1 is particularly simple and immediate.

In the first operative configuration K, the first abutment face 20A is arranged almost parallel with the blocking pin 71 and both are arranged almost parallel with the longitudinal axis Y.

Therefore, the first abutment face 20A forms a stop for the blocking pin 71, preventing movement thereof in the direction of the longitudinal axis Y in order to become disengaged from the cross-piece 2.

Similarly, in the second operative configuration K1, the second abutment face 21A is arranged almost parallel with the connection wall 16B and both are arranged almost parallel with the longitudinal axis Y of the leg 4.

In this manner, accidental movements of the legs 4 from the first or second operative configurations K, K1 are prevented.

Therefore, the invention solves the technical problem set forth above and achieves a number of advantages.

As a result of the invention, there is obtained a tripod which can be positioned and closed in a simple and rapid manner because, in order to adjust the angle of the legs 4, it is simply necessary to grip the leg 4 itself in the most readily accessible portion thereof with the hand of the user.

Furthermore, the tripod 1 has stable positioning.

The tripod 1 of the invention provides for axial actuation, that is to say, along the longitudinal axis Y of the legs 4 in order to actuate the support legs 4 themselves. Therefore, transverse movements relative to the longitudinal axis Y in order to actuate the support legs 4 are avoided. This design increases the stability and reliability of the tripod 1.

This design makes actuation of the legs 4 and therefore of the tripod 1 more precise including in the case of legs and tripods having small dimensions.

Furthermore, since the tripod 1 is provided with a cylindrical actuation mechanism for moving the second leg portion 42 away from the first leg portion 41, the actuation of the legs 4 is particularly convenient and simple.

In fact, the user can grip the second leg portion 42 in a desired position and can apply the necessary force.

Furthermore, the legs 4 of the tripod 1 of the invention do not have levers and/or buttons, the actuation of which would be difficult, especially in a tripod with small dimensions.

Furthermore, the legs 4 of the tripod 1 of the invention do not have levers and/or buttons and/or actuation members for adjusting the angle of inclination of the legs 4 with respect to the cross-piece 2. This design allows the production of a tripod which is consequently more compact, has a lower weight with respect to tripods with other actuation mechanisms and a reduced possibility that any belts or accessories of the video-photographic camera can become entangled with the tripod.

Furthermore, the possible risk of any actuation mechanisms breaking in the event of the tripod being dropped is reduced.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure.

The invention claimed is:

1. A support tripod for video-photographic equipment comprising:
   a cross-piece having a plurality of hinge elements and a mount for the video-photographic equipment;
   a plurality of support legs which can be pivoted with respect to the cross-piece in order to open and close the tripod, each leg having (a) a longitudinal axis, (b) a first leg portion which is articulated to a corresponding one of the hinge elements so that the leg can be pivoted between a closed configuration, in which the legs are arranged almost parallel with each other, and at least one operative configuration, in which the legs are apart with respect to the cross-piece, and (c) a second leg portion which is parallel with and connected to the first leg portion, the second leg portion having a member which extends mainly along the longitudinal axis; and
   a blocking device which is received in the second leg portion and which is fixed to the second leg portion in order to be moved together therewith along the longitudinal axis, the blocking device blocking the leg at least in the first operative configuration, wherein the blocking device comprises a blocking pin which extends along the longitudinal axis of the leg and which has a first portion which is fixed to the second leg portion and an opposing free end which interacts with the cross-piece in order to block the leg,
   wherein the second leg portion can slide along the longitudinal axis, moving with respect to the first leg portion to release the leg from the cross-piece and make the leg pivotable with respect to the cross-piece.

2. The tripod according to claim 1, wherein the second leg portion and the first leg portion are coaxial.

3. The tripod according to claim 1, wherein the second leg portion can slide along the longitudinal axis, moving with respect to the first leg portion to release the leg from the cross-piece and make the leg able to pivot away from the closed configuration.

4. The tripod according to claim 1, wherein the legs define a rotation path and multiple opening angles with respect to the closed configuration and the cross-piece comprises at least a first positioning element and a second positioning element which follow each other circumferentially about the rotation path of the legs defining a first operative configuration and a second operative configuration for the legs having a different opening angle with respect to the closed configuration.

5. The tripod according to claim 4, wherein the first positioning element comprises a first abutment face which is arranged, in the first operative configuration, almost parallel with the blocking pin, the first abutment face and the blocking pin being arranged almost parallel with the longitudinal axis in the first operative configuration.

6. The tripod according to claim 4, wherein the first leg portion comprises a second blocking device which is arranged to block the tripod in the second operative configuration which is different from the first operative configuration.

7. The tripod according to claim 6, wherein the second positioning element comprises a second abutment face which is arranged in the second operative configuration almost parallel with the second blocking device, the second abutment face and the second blocking device being arranged almost parallel with the longitudinal axis in the second operative configuration.

8. The tripod according to claim 1, wherein the blocking device further comprises a spring which is configured to urge the blocking pin into abutment against the cross-piece.

9. The tripod according to claim 1, wherein the first leg portion is internally hollow in order to define a longitudinal cavity in which the blocking pin of the blocking device is slidingly received.

10. The tripod according to claim 1, further comprising an adjustment device that adjusts the position of the second leg portion along the longitudinal axis with respect to the first leg portion, the adjustment device being fixedly joined in terms of translational movement along the longitudinal axis to the second leg portion.

11. A support tripod for video-photographic equipment comprising:
- a cross-piece having a plurality of hinge elements and a mount for the video-photographic equipment;
- a plurality of support legs which can be pivoted with respect to the cross-piece in order to open and close the tripod, each leg having (a) a longitudinal axis, (b) a first leg portion which is articulated to a corresponding one of the hinge elements so that the leg can be pivoted between a closed configuration, in which the legs are arranged almost parallel with each other, and at least one operative configuration, in which the legs are apart with respect to the cross-piece, and (c) a second leg portion which is parallel with and connected to the first leg portion, the second leg portion having a member which extends mainly along the longitudinal axis; and
- a tubular actuation device for moving the second leg portion with respect to the first leg portion along the longitudinal axis in order to release the leg from the cross-piece and make the leg pivotable with respect to the cross-piece,
- wherein the second leg portion can slide along the longitudinal axis, moving with respect to the first leg portion to release the leg from the cross-piece and make the leg pivotable with respect to the cross-piece.

12. The tripod according to claim 1, further comprising an adjustment device that adjusts the position of the second leg portion along the longitudinal axis with respect to the first leg portion, the adjustment device being fixedly joined in terms of translational movement along the longitudinal axis to the second leg portion.

13. A support tripod for video-photographic equipment comprising:
- a cross-piece having a plurality of hinge elements and a mount for the video-photographic equipment;
- a plurality of support legs which can be pivoted with respect to the cross-piece in order to open and close the tripod, each leg having (a) a longitudinal axis, (b) a first leg portion which is articulated to a corresponding one of the hinge elements so that the leg can be pivoted between a closed configuration, in which the legs are arranged almost parallel with each other, and at least one operative configuration, in which the legs are apart with respect to the cross-piece, and (c) a second leg portion which is parallel with and connected to the first leg portion, the second leg portion having a member which extends mainly along the longitudinal axis;
- a blocking device which is received in the second leg portion and which is fixed to the second leg portion in order to be moved together therewith along the longitudinal axis;
- an adjustment device that adjusts the position of the second leg portion along the longitudinal axis with respect to the first leg portion, the adjustment device being fixedly joined in terms of translational movement along the longitudinal axis to the second leg portion; and
- a tubular actuation device for moving the second leg portion with respect to the first leg portion along the longitudinal axis in order to release the leg from the cross-piece and make the leg pivotable with respect to the cross-piece,
- wherein the second leg portion can slide along the longitudinal axis, moving with respect to the first leg portion to release the leg from the cross-piece and make the leg pivotable with respect to the cross-piece, and
- wherein the legs define a rotation path and multiple opening angles with respect to the closed configuration and the cross-piece comprises at least a first positioning element and a second positioning element which follow each other circumferentially about the rotation path of the legs defining a first operative configuration and a second operative configuration for the legs having a different opening angle with respect to the closed configuration, the blocking device blocking the legs at least in the first operative configuration.

14. The tripod according to claim 13, wherein the blocking device comprises a blocking pin which extends along the longitudinal axis of the leg and which has a first portion which is fixed to the second leg portion and an opposing free end which interacts with the cross-piece in order to block the leg.

15. The tripod according to claim 13, wherein the first leg portion comprises a second blocking device which is arranged to block the tripod in the second operative configuration which is different from the first operative configuration.

16. The tripod according to claim 12, wherein the adjustment device, the blocking device, and the second leg portion are fixedly joined in terms of translational movement along the longitudinal axis.

17. The tripod according to claim 13, wherein the adjustment device, the blocking device, and the second leg portion are fixedly joined in terms of translational movement along the longitudinal axis.

18. A support tripod for video-photographic equipment comprising:
- a cross-piece having a plurality of hinge elements and a mount for the video-photographic equipment;
- a plurality of support legs which can be pivoted with respect to the cross-piece in order to open and close the tripod, each leg having (a) a longitudinal axis, (b) a first leg portion which is articulated to a corresponding one of the hinge elements so that the leg can be pivoted between a closed configuration, in which the legs are arranged almost parallel with each other, and at least one operative configuration, in which the legs are apart with respect to the cross-piece, and (c) a second leg portion which is parallel with and connected to the first leg portion, the second leg portion having a member which extends mainly along the longitudinal axis;
- a blocking device which is received in the second leg portion and which is fixed to the second leg portion in order to be moved together therewith along the longitudinal axis, the blocking device having a blocking pin which extends along the longitudinal axis of the leg and which has a first portion which is fixed to the second leg portion and an opposing free end which interacts with the cross-piece in order to block the leg;
- a second blocking device on the first leg portion;
- an adjustment device that adjusts the position of the second leg portion along the longitudinal axis with respect to the first leg portion, the adjustment device being fixedly joined in terms of translational movement along the longitudinal axis to the second leg portion; and
- a tubular actuation device for moving the second leg portion with respect to the first leg portion along the longitudinal axis in order to release the leg from the cross-piece and make the leg pivotable with respect to the cross-piece, wherein the adjustment device, the blocking device, and the second leg portion are fixedly joined in terms of translational movement along the longitudinal axis, wherein the second leg portion can slide along the longitudinal axis, moving with respect to the first leg portion to release the leg from the cross-piece and make the leg pivotable with respect to the cross-piece, and wherein the legs define a rotation path and multiple opening angles with respect to the dosed configuration and the cross-piece comprises at least a first positioning element and a second positioning element which follow each other circumferentially about the rotation path of the legs defining a first operative configuration and a second operative configuration for the legs having a different opening angle with respect to the closed configuration, the blocking device blocking the legs at least in the first operative configuration and the second blocking device blocking the tripod in the second operative configuration which is different from the first operative configuration.

* * * * *